March 31, 1964 G. BAUMANN 3,126,989
ELECTROMAGNETIC CLUTCH CONTROL ARRANGEMENT
Filed July 25, 1962
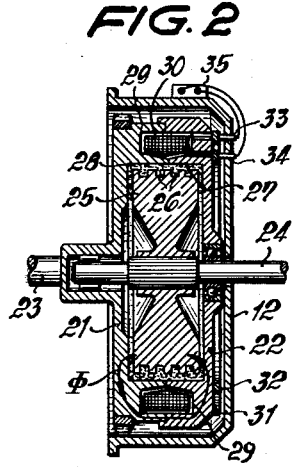
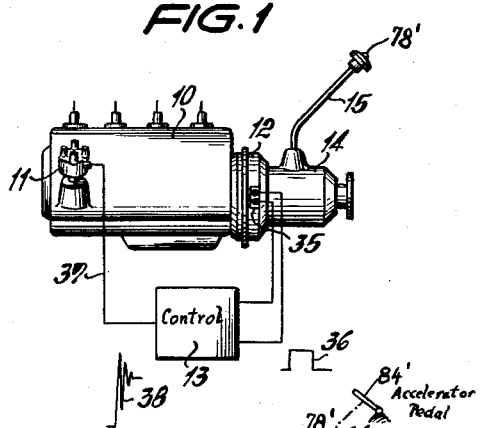
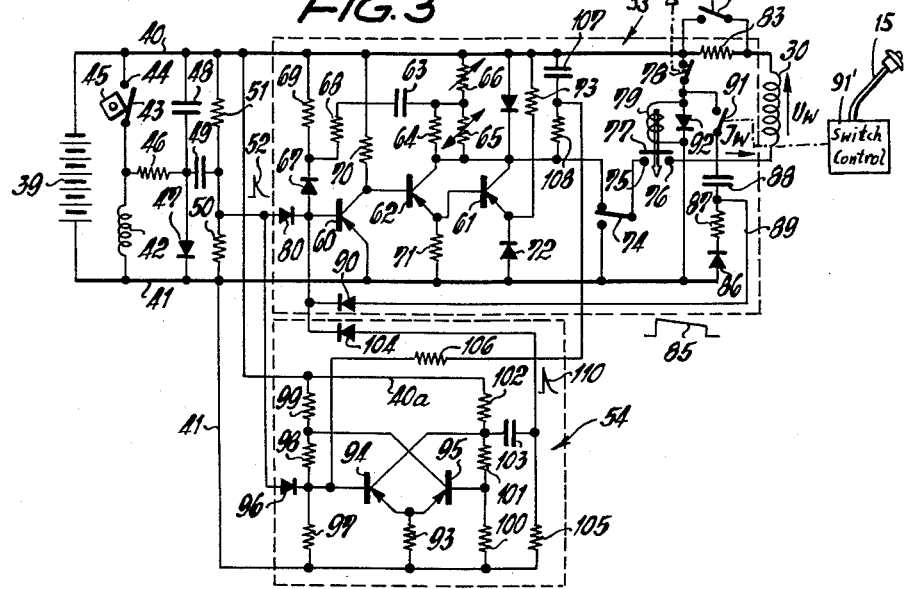
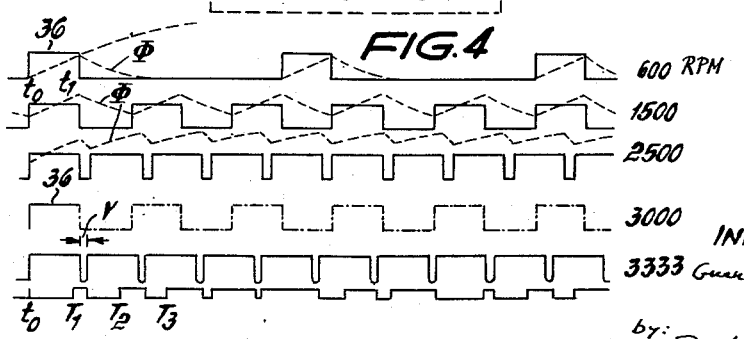
INVENTOR
Guenther Baumann
by: Michael S. Striker
Atty.

United States Patent Office 3,126,989
Patented Mar. 31, 1964

3,126,989
ELECTROMAGNETIC CLUTCH CONTROL
ARRANGEMENT
Guenther Baumann, Stuttgart, Germany, assignor to
Robert Bosch G.m.b.H., Stuttgart, Germany
Filed July 25, 1962, Ser. No. 212,285
Claims priority, application Germany July 28, 1961
9 Claims. (Cl. 192—3.5)

The present invention concerns an electromagnetic clutch control arrangement, and more particularly an arrangement for controlling an electromagnetic clutch used in a motor vehicle in connection with the engine for starting the movement of the vehicle and during gear shift operations. A clutch of this type comprises an electromagnet having a winding which is energized by energizing pulses applied thereto by a monostable relaxation oscillator at a frequency increasing with the rotary speed of the engine, the oscillator being changed by control pulses in synchronism with the motor speed from its stable nonconductive condition to its unstable second condition which determines the duration of the energizing pulses.

It is required that clutches of this type are changed to torque transmitting condition by the respective control arrangement whenever the motor speed has been increased to about twice its idling speed. It is necessary that the torque transmitted by the clutch can increase from the smallest possible value available at the idling speed of the motor to a maximum value limited only by the structural dimensions of the clutch in which case the energizing pulses follow each other so rapidly that the magnetic field in the clutch only insignificantly decreases during the intervals between two consecutive energizing pulses.

During operation of the vehicle the clutch must be changed to torque-transmitting condition when after a gear shifting operation energy is to be transmitted again from the engine to the drive shaft of the vehicle. Generally, this is always possible simply by increasing the speed of the engine provided that the now engaged gears cause a greater speed of the vehicle than the previously engaged gears. However, if it is desired e.g. during downhill travel of the vehicle to use the engine as a brake and to shift the gears from a speed position with a small step-down ratio to a speed position with a greater step-down ratio, it would be contrary to the driver's natural tendency of handling the gear shift if the engine should be accelerated for causing the clutch automatically to return to torque-transmitting condition.

It is therefore one of the objects of this invention to provide for a control arrangement which overcomes the above described difficulty.

Other objects will become apparent from the following description of embodiments of the invention.

With above objects in view, the invention includes, in an automotive vehicle having an engine and a gear shift control and electromagnetic clutch means including electromagnetically activable clutching members, one thereof being connected with one, the other one being connected with another one of two rotatable members and adapted to transmit torque from one to the other member upon application of pulsating electric energy to said electromagnetic clutch means, in combination, a source of electric energy; electric pulse generator means cooperating with the engine for furnishing electric control pulses in rhythm with the operational cycles of the engine; electric oscillator means energized by said source and supplied with said control pulses and furnishing in accordance therewith energizing pulses of predetermined duration to the electromagnetic clutch means for energizing the latter; and auxiliary circuit means controllable by the gear shift control and furnishing at the end of a gear shift operation a control pulse of a second predetermined duration to said electric oscillator means for causing the latter to furnish an energizing pulse of corresponding duration to said clutch.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic illustration of a vehicle engine assembled with a gear shift arrangement and an electromagnetic clutch;

FIG. 2 is an axial section of such a clutch;

FIG. 3 is a schematic circuit diagram of the control arrangement for the clutch; and FIG. 4 is a group of diagrams illustrating the operation of the control arrangement.

The internal combustion engine 10 operating a vehicle not shown cooperates with a high voltage ignition apparatus, the distributor of which is indicated at 11. The housing 12 of the electromagnetic clutch is attached to the engine and the clutch is energizable by a control arrangement 13 automatically as will be explained in reference to FIG. 3 whenever the rotary speed of the engine is increased to a point above a minimum or idling speed. A gear shift box 14 of conventional type and comprising a gear shift lever 15 is attached to the clutch housing 12.

Referring now to FIG. 2, the electromagnetic clutch comprises within its housing 12 two concave plate members 21 and 22 which constitute together a hollow shell rigidly connected with the crank shaft 23 of the engine and constituting at the same time the flywheel of the engine. Additionally the clutch comprises a rotor 25 mounted on the drive shaft 24 and provided with a plurality of grooves 26 arranged along the circumference of the rotor. In practical embodiments of this type of a clutch an annular gap of 1 to 2 mm. radial width is provided between the circumference of the rotor 25 and the inner circumferential face 27 of the above mentioned shell. The empty space between the shell members 21, 22 and the rotor 25 is partly filled with a magnetizable powder 28 which is driven by centrifugal force into the above mentioned annular gap as soon as the engine is in operation. In the two faces of the members 21 and 22 abutting against each other annular grooves 29 are provided and accommodate a magnet winding 30. The ends of the magnet winding 30 are connected with slip rings 31 and 32, respectively, which are mounted on the outer face of the member 22 and are insulated against each other. Two brushes 33 and 34 insulated against each other cooperate with the slip rings, respectively, and are connected with a terminal block 35 mounted on the outside of the housing 12, and the terminals of this terminal box, and thereby the magnet winding 30, are connected with the control arrangement 13. This control arrangement furnishes the electric energy required for the transmission of torque in the form of approximately rectangular pulses one of which is diagrammatically indicated at 36 in FIG. 1. For producing these pulses the input of the control arrangement 13 is connected with the distributor 11 of the high voltage ignition apparatus by a cable 37 by means of which the above mentioned energizing pulse 38 is applied to the control arrangement 13 (shown in detail in FIG. 3) every time an ignition is effected.

The control arrangement according to FIG. 3 is energized via a negative line 40 and a positive line 41 by a storage battery 39 which also energizes the ignition apparatus. The primary winding 42 of the otherwise not illustrated ignition coil of the ignition apparatus is connected in circuit with the interrupter switch 43, 44 located within the distributor 11 and connected between the lines 40 and 41. The interrupter switch arm 43 cooperates with a stationary contact 44 connected with the line 40 and is lifted from the contact 44 twice with every revolution of the engine crankshaft by means of a four-lobe cam 45 also located within the distributor housing. Every time when the contacts 43 and 44 are separated a voltage is generated across the primary winding 42 and is applied via the resistor 46 of 15,000 ohms to a rectifier 47 and to a capacitor 48 of .02 μf. This voltage is differentiated by means of a second capacitor 49 of .02 μf. and a resistor 50 of 10,000 ohms and another resistor 51 of 40,000 ohms in such a manner that upon each lifting movement of the interrupter arm 43 a control pulse 52, positive relative to the potential of the positive line 41, for the control arrangement 13 is produced. The arrangement 13 comprises a monostable relaxation oscillator 53 and a bistable multivibrator 54 serving as an electronic storage means which becomes effective only at elevated speeds of the engine. The storage arrangement will be described further below.

The oscillator which furnishes the energizing pulses 36 for the magnet winding 30 is indicated by the dotted line 53 and comprises an input transistor 60, an output transistor 61, an amplifying transistor 62 therebetween and a capacitor 63 acting as a time determining element which controls the duration of the individual energizing pulses and has a capacity of .5 μf. One of the electrodes of this capacitor is connected via a fixed resistor 64 of 10,000 ohms and via a parallel-connected heat-responsive resistor 65 (exposed to the temperature of the engine) with the interconnected collectors of the transistors 61 and 62 and also via a variable resistor 66 with the negative line 40.

The other electrode of the capacitor 63 is connected with the base of the input transistor 60 via a rectifier 67 and a resistor 68 of 150 ohms, and also via the same resistor 68 and an additional resistor 69 of 30,000 ohms with the negative line 40. The collector of the input transistor 60 is connected with the base of the transistor 62 and via a load resistor 70 of 2,500 ohms with the negative line 40. The emitter of transistor 60 is directly connected with the positive line 41. The emitter of the amplifying transistor 62 is connected directly with the base of the transistor 61 and also via a resistor 71 of 40 ohms with the line 41. The emitter of the output transistor 61 is connected with the positive line 41 by way of a rectifier 72 which, together with the resistor 73 of 600 ohms connected to the negative line 40, constitutes a voltage divider which assures that the output transistor 61 can be rendered completely non-conductive during the intervals between consecutive energizing pulses 36.

The magnet coil 30 of the clutch is connected at one end with the negative line 40 while its other end is connected with the collectors of the transistors 61 and 62 via a change-over switch arm 74 (in the position as shown) which has no function in the operation according to the invention, and via normally closed relay contacts 75, 76, 77. The switch 74 permits, when in its second position (not shown), to start the engine e.g. by pushing the car with engaged clutch and engaged gear transmission in case the starter motor should be defective. As long as the relay coil 79 connected at one end with the positive line 41 and at the other end via a normally open switch 78 with the negative line 40 is not energized, the relay contacts 75, 76, 77 remain closed. The switch 78 is moved to closed position and the button bridge 77 is lifted from the contacts 75 and 76 by energization of the coil 79 so as to disconnect the magnet winding 30 as soon as the gear shift lever 15 is gripped by the operator for shifting gears and a switch contact 78' mounted in the lever 15 is actuated.

For the purpose of describing the operation of the oscillator 53 it is to be understood that during standstill of the engine and, during its operation, the input transistor 60 is in conductive condition immediately before each ignition because its base is connected with the negative line 40 via rectifier 67 and resistor 69. As soon as after the start of the engine the interrupter cam 45 lifts the interrupter switch arm 43 from the contact 44 at the moment $t_0$ indicated in FIG. 4 whereby the current flowing up to then through the primary winding 42 of the ignition coil is interrupted, a control pulse 52 is generated which is applied via rectifier 80 to the base of the input transistor 60 so as to render the latter positive relative to the potential of the positive line 41 and to promptly block the input transistor 60. Hereby the transistors 61 and 62 are rendered fully conductive. Since during the preceding interval the potential at the collectors of the transistors 61 and 62 was practically equal to that of the negative line 40 while the base of the input transistor 60 had approximately the same potential as the positive line 41, the capacitor 63 holds a considerable charge at the start of the energizing pulse 36 triggered by the control pulse 52. The potential at the capacitor 63 is added to the partial voltage developing across the resistor 66 at the beginning of the energizing pulse and holds therefore the base of the input transistor at positive potential beyond the end of the control pulse and until the capacitor 63 has discharged via the resistors 68, 69. Now the input transistor 60 can return to its previous conductive condition and can block the transistors 61 and 62 whereby the energizing pulse is terminated at the moment $T_1$ (FIG. 4). Upon the next following opening of the interrupter contacts 43, 44 the next control pulse is generated which produces in the oscillator 53 another energizing pulse 36 of equal duration.

The capacity of the capacitor 63 in relation to the resistors 66, 68, and 69 arranged in the discharge circuit, and also in relation to the resistors 64 and 65 is so chosen that the duration of an energizing pulse is 10 msec. when the engine is warm. Since at an idling speed of 600 r.p.m. of the engine the repetition period of the control pulses is 1/20 sec., the main value of the periodic energization of the clutch is so low that not enough torque can be transmitted to start the vehicle moving even if the drive is in first gear i.e. at the greatest step-down ratio between the crankshaft and the drive shaft of the vehicle.

In order to start the vehicle from standstill it is only necessary to accelerate the engine by actuating the gas pedal. The thus increased speed of the engine causes an increased frequency of the energizing pulses 36 furnished by the oscillator 53, the duration of the individual energizing pulses 63 remaining constant while the intervals between the individual pulses decreases with increasing engine speed as can be seen easily from FIG. 4 by comparing the diagrams related to 600 r.p.m. (idling speed) and 1500 r.p.m. A further increase of the transmittable torque is obtained not only by the increase of the engine speed but also by shunting a resistor 83 of about 3 ohms located in the circuit of the clutch winding 30 by closing a bypass switch 84 operatively connected with the accelerator pedal 84' whereby the mean value of the magnetic flux $\phi$ produced by the energizing pulses in the clutch is increased so that a greater torque can be transmitted.

When the driver grips the gear shaft lever 15 and depresses or otherwise actuates the control button 78' so as to close the switch 78, the relay coil 79 is energized, the bridge contact 77 is lifted and thus the connection between the transistors 61 and 62 and the magnet winding 30 is interrupted. Thus the clutch is "disengaged." After shifting the gears the engine must be accelerated by increasing the fuel supply in order to cause the clutch to change again to torque-transmitting condition. However, this is undesirable if, for instance, during downhill travel the motor is to be used as a brake by changing the speed condition of the gear transmission from a small step-down ratio to a greater step-down ratio, e.g. from third speed to second speed. In this case the clutch would not return to "engaged" condition if the engine has returned to idling speed during the gear shift operation. The clutch would transmit torque only when the engine is again accelerated. However, such a procedure is undesirable.

Therefore, the invention provides an arrangement whereby, after the driver has released the lever 15 and thereby caused the switch 78 to open, a control pulse 85 is produced which has a duration of .5 to 1 second and is independent of the rotary speed of the engine. This control pulse 85 serves to render the transistors 61 and 62 conductive for the just indicated period of time whereby the clutch is changed to torque-transmitting condition. This arrangement comprises a rectifier 86 connected with the positive line 41, a series-connected resistor 87 of 300 ohms, a capacitor 88 of 25 μf. and a control line 89 which starts at the junction point between resistor 87 and capacitor 88 and leads via a rectifier 90 to the base of the input transistor 60. The capacitor 88 is charged approximately to the battery voltage via a switch 91 during the gear shift operation while the switch 78 is closed as mentioned above. The switch 91 is mechanically coupled with a switch control 91' operated also by the gear shift lever 15 so as to close the switch 91 only when the gear transmission is set for the first speed or for reverse gear. When now the gear shift lever 15 and the control button 78' are released and switch 78 is opened, the capacitor 88 is connected with its electrode which was previously connected with the negative line 40, via the relay coil 79 with the positive line 41 whereby the potential at the base of the input transistor 60 is raised via the above described connections in positive direction above the potential of the positive line 41. Hereby the capacitor 88 renders the transistors 61 and 62 conductive until it has discharged via the rectifier 67 and the resistor 69. Consequently, the clutch is during this period of time in torque-transmitting condition and is capable of transmitting at sufficient traveling speed of the vehicle sufficient torque from the drive shaft to the crankshaft of the engine so that the latter is operated with braking effect at so high a rotary speed that the control pulses produced by the engine follow each other so rapidly that the clutch remains capable of transmitting continuously the required torque. In this manner the clutch is automatically re-energized after the gear shift operation without the necessity of increasing the fuel supply.

The winding 79 of the relay is shunted by a rectifier 92 in order to prevent dangerous inductive voltage peaks from developing upon the release of the lever 15 and opening of switch 78 whereby otherwise the transistor 60 could be damaged.

Now the above mentioned storage arrangement 54 will be described which becomes effective when the engine operates at so high a speed that during the intervals between consecutive energizing pulses no sufficient time remains for charging the capacitor 63. As a matter of fact, a further increase of the engine speed may even cause a control pulse 52 to occur during an energizing pulse 36 initiated by the preceding control pulse in which case the second control pulse would not be able to block the input transistor 60 because the latter is already being held in non-conductive condition during the energizing pulses. In order to illustrate the resulting operating conditions FIG. 4 contains also a diagram related to a rotary speed of 3333 r.p.m. The dotted diagram for 3000 r.p.m. illustrates the case where the intervals between the pulses 36 would have the same length as the actual pulses so that the number of energizing pulses per unit of time would be the same as in the case of 1500 r.p.m. Therefore the arrangement 54 starts taking effect at about 3000 r.p.m. Only in order to show its effect more clearly the example referring to 3333 r.p.m. has been selected.

In this case the consecutive control pulses 52 occur at intervals of 9 msec. at the moments marked $T_1$, $T_2$, $T_3$, etc. Therefore most of them occur during the energizing pulses 36 having each a duration of 10 msec. The storage arrangement 54 is designed to store those control pulses which otherwise would be ineffective, until they can be rendered effective after the termination of a corresponding energizing pulse.

The storage arrangement 54 comprises two transistors 94 and 95 which have their emitters interconnected and jointly connected via a common resistor 93 of 120 ohms with the positive line 41. The base of the input transistor 94 is connected via a rectifier 96 with the capacitor 49 which furnishes the control pulses 52. In addition, the just mentioned base is connected via a resistor 97 of 1200 ohms directly with the positive line 41. Moreover, the same base is also connected via a resistor 98 of 5000 ohms with the collector of the output transistor 95 and further via a resistor 99 of 2000 ohms with an auxiliary connection 40a which leads to the negative line 40. The base of the output transistor 95 is connected via a resistor 100 of 1200 ohms with the positive line 41 and is also connected via a resistor 101 of 5000 ohms with the collector of the input transistor 94. This collector is connected via a resistor 102 of 2000 ohms with the auxiliary connection 40a and additionally via a capacitor 103 of .05 μf. and via a rectifier 104 with the base of the input transistor 60 of the oscillator 53. A resistor 105 of 3000 ohms is connected between the positive line 41 and the junction point between the capacitor 103 and the rectifier 104. Additionally, the base of the input transistor 94 is connected via a resistor 106 of 4000 ohms with the junction point between a capacitor 107 of .5 μf. otherwise connected with the line 40 and a resistor 108 (1200 ohms) the other side of which is connected with the collector of the output transistor 61.

As long as the two transistors 61 and 62 are in non-conductive condition during the intervals between consecutive energizing pulses, the collectors thereof as well as the resistor 108 connected therewith are connected via switch 74, relay contacts 75, 77, 76 and the now currentless winding 30 with the negative line 40 and hold thereby via resistor 106 the base of the input transistor 94 at a potential which is negative relative to that of the positive line 41. Hereby the input transistor 94 is held in conductive condition. Consequently, when a control pulse 52 reaches the base of the input transistor 94 via the rectifier 96 while the transistors 61 and 62 are non-conductive, the control pulse 52 is not capable of changing the condition of the storage arrangement 54. If, however, a control pulse 52 is produced while the transistors 61 and 62 are conductive during an energizing pulse so that their collectors are practically at the potential of the positive line 41, then the storage arrangement 54 is in condition for receiving such control pulse. This pulse is now able to render the input transistor 94 of the storage arrangement 54 non-conductive and to render its output transistor 95 conductive. The collector current of the output transistor 95 now flowing through the resistor 99 holds the input transistor 94 in non-conductive condition beyond the duration of the control pulse 52. This condition is now maintained until the two transistors 61 and 62 are rendered non-conductive at the end of the current energizing pulse. However, the storage arrangement must not render the transistors 61 and 62 of the oscillator conductive immediately again for initiating a further energizing pulse because the capacitor 63 which serves as time determining element controlling the duration of the energizing pulses must be given an opportunity to be charged again. The short delay time required therefor is provided by the capacitor 107 which is able to be charged to the voltage $U_w$ across the winding 30 during the individual energizing pulses. That electrode of the capacitor 107 which is connected with the base of the input transistor 94 maintains first the potential which it has at the end of each energizing pulse and which then is discharged via the resistor 108 and the clutch winding 30 at a velocity predetermined by the magnitude of resistor 108. Only when the capacitor 107 has discharged to such a degree that the potential at the base of the input transistor 94 is reduced via resistors 106 and 108 to a value below the collector potential of the transistor 95, the input transistor 94 returns, after the interval $v$ indicated in FIG. 4 and immediately following the termination of the preceding energizing pulse, to its previous conductive condition whereby now the output transistor 95 is rendered non-conductive. Since during the preceding conductive condition of the output transistor 95 the capacitor 103 was charged via the resistors 100, 101, 102 and 105, the base of the up to then conductive input transistor 60 becomes positive relative to the positive line 41 as soon as the input transistor 94 is again rendered conductive and causes a considerable voltage drop by its collector current across the resistor 102. The control pulse 52 which could not be utilized by the oscillator 53 but was stored by the bistable multivibrator 54 is applied now in the form of a secondary control pulse 110 via rectifier 104 to the oscillator 53 and initiates after the delay interval $v$ the next following energizing pulse.

The particular advantage resulting from the provision of the storage arrangement 54 can be judged from the diagram related to 3000 r.p.m. in FIG. 4. As mentioned above, at this speed every second control pulse 52 would coincide with the end of the preceding energizing pulse 36 and would therefore not have any effect in the oscillator 53. The latter would only be able to furnish a sequence of energizing pulses which is identical with that obtained at 1500 r.p.m. so that it would not be possible to transmit by the clutch the powerful torque which is available from the engine at 3000 r.p.m. However, by providing the storage arrangement 54 the otherwise not utilizable control pulses are rendered effective for initiating energizing pulses at speeds of about 3000 r.p.m. and above.

For further improving the operational behavior of the electronic control arrangement according to the invention the heat-responsive resistor 65 forming a voltage divider with the resistor 66 is provided and arranged to be exposed to the heat or temperature in a suitable portion of the engine. The function of this resistor is to shorten the energizing pulses when the engine is still cold. In this manner it is possible to allow at low engine temperature for a higher idling speed of the engine without producing an increase of the transmittable torque at the now increased idling speed. When the resistance of the temperature-responsive resistor 65 is low at elevated engine temperature, the junction point between the resistors 65 and 66 carries a comparatively high potential as long as the transistors 61 and 62 are in conductive condition.

Since the input transistor at the end of an energizing pulse can return to its conductive condition only when its base potential has dropped below the potential of the positive line 41, while the base potential is determined by the sum of the voltage drop across resistor 66 and of the varying potential at the discharging capacitor 63, the individual energizing pulse has a duration which is the longer the hotter is the engine and the smaller is therefore the resistance of the resistor 65. In this manner a satisfactory compensation is obtained for the idling speed increase required at low temperatures.

It will be understood that each of the elements described above, or two or more together, may also find a useful application in other types of electromagnetic clutch control arrangements differing from the types described above.

While the invention has been illustrated and described as embodied in electromagnetic clutch control arrangements including storage means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an automotive vehicle having an engine and a gear shift control and electromagnetic clutch arrangement including electromagnetically activable clutching members, one thereof being connected with one, the other one being connected with another one of two rotatable members and adapted to transmit torque from one to the other member upon application of pulsating electric energy to said electromagnetic clutch arrangement, in combination, a source of electric energy; electric pulse generator means co-operating with the engine for furnishing electric control pulses in rhythm with the operational cycles of the engine; electric oscillator means energized by said source and supplied with said control pulses and furnishing in accordance therewith energizing pulses of predetermined duration to the electromagnetic clutch arrangement for energizing the latter; and auxiliary circuit means operatively connected with the gear shift control for being controlled thereby and furnishing at the end of a gear shift operation a control pulse of a second predetermined duration to said electric oscillator means for causing the latter to furnish an energizing pulse of corresponding duration to said electromagnetic clutch.

2. In an automotive vehicle having an engine and a gear shift control and electromagnetic clutch arrangement including electromagnetically activable clutching members, one thereof being connected with one, the other one being connected with another one of two rotatable members and adapted to transmit torque from one to the other member upon application of pulsating electric energy to said electromagnetic clutch arrangement, in combination, a source of electric energy; electric pulse generator means co-operating with the engine for furnishing electric control pulses in rhythm with the operational cycles of the engine; electric oscillator means energized by said source and supplied with said control pulses and furnishing in accordance therewith energizing pulses of predetermined duration to the electromagnetic clutch arrangement for energizing the latter; and auxiliary circuit means operatively connected with the gear shift control for being controlled thereby and including a series-combination of resistor means and capacitor means which is connected with said source when a gear shift operation is started so as to cause charging of said capacitor means to a predetermined potential and which is disconnected from said source when said gear shift operation is substantially terminated, said capacitor means being connected with said electric oscillator means for furnishing by its discharge at the end of a gear shift operation a control pulse of a second predetermined duration to said electric oscillator means for causing the latter to furnish an energizing pulse of corresponding duration to said electromagnetic clutch.

3. In an automotive vehicle having an engine and a gear shift control and electromagnetic clutch arrangement including electromagnetically activable clutching members, one thereof being connected with one, the other one being connected with another one of two rotatable members and adapted to transmit torque from one to the other member upon application of pulsating electric energy to said electromagnetic clutch arrangement, in combination, a source of electric energy; electric pulse generator means co-operating with the engine for furnishing electric control pulses in rhythm with the operational cycles of the engine; electric oscillator means energized by said source and supplied with said control pulses and furnishing in accordance therewith energizing pulses of predetermined duration to the electromagnetic clutch arrangement for energizing the latter; and auxiliary circuit means operatively connected with the gear shift control for being controlled thereby and including a series-combination of resistor means and capacitor means which is connected with said source when a gear shift operation is started so as to cause charging of said capacitor means to a predetermined potential and which is disconnected from said source when said gear shift operation is substantially completed, said capacitor means being connected with said electric oscillator means for furnishing by its discharge at the end of a gear shift operation a control pulse of a second predetermined duration substantially within a range between .1 and 1 second to said electric oscillator means for causing the latter to furnish an energizing pulse of corresponding duration to said electromagnetic clutch.

4. In an automotive vehicle having an engine and a gear shift control and electromagnetic clutch arrangement including electromagnetically activable clutching members, one thereof being connected with one, the other one being connected with another one of two rotatable members and adapted to transmit torque from one to the other member upon application of pulsating electric energy to said electromagnetic clutch arrangement, in combination, a source of electric energy; electric pulse generator means co-operating with the engine for furnishing electric control pulses in rhythm with the operational cycles of the engine; electric oscillator means energized by said source and supplied with said control pulses and furnishing in accordance therewith energizing pulses of predetermined duration to the electromagnetic clutch arrangement for energizing the latter; and auxiliary circuit means operatively connected with the gear shift control for being controlled thereby and including a series-combination of a rectifier means, resistor means and capacitor means, said series-combination being connected at its rectifier end with one terminal of said source, and normally open switch means arranged between said capacitor means and the other terminal of said source and movable to closed position by the gear shift control upon starting a gear shift operation so as to cause charging of said capacitor means to a predetermined potential during the gear shift operation, said switch means being movable to open position by said gear shift control at the end of said gear shift operation so as to disconnect said series-combination from said source, said capacitor means being connected with said electric oscillator means for furnishing by its discharge at the end of a gear shift operation a control pulse of a second predetermined duration substantially within a range between .1 and 1 second to said electric oscillator means for causing the latter to furnish an energizing pulse of corresponding duration to said electromagnetic clutch.

5. In an automotive vehicle having an engine and a gear shift control and electromagnetic clutch arrangement including electromagnetically activable clutching members, one thereof being connected with one, the other one being connected with another one of two rotatable members and adapted to transmit torque from one to the other member upon application of pulsating electric energy to said electromagnetic clutch arrangement, in combination, a source of electric energy; electric pulse generator means co-operating with the engine for furnishing electric control pulses in rhythm with the operational cycles of the engine; electric oscillator means energized by said source and supplied with said control pulses and furnishing in accordance therewith energizing pulses of predetermined duration to the electromagnetic clutch arrangement for energizing the latter; and auxiliary circuit means operatively connected with the gear shift control for being controlled thereby and including a series-combination of a rectifier means, resistor means and capacitor means, said series-combination being connected at its rectifier end with one terminal of said source, and normally open switch means arranged between said capacitor means and the other terminal of said source and movable to closed position by the gear shift control upon starting a gear shift operation so as to cause charging of said capacitor means to a predetermined potential during the gear shift operation, said switch means being movable to open position by said gear shift control at the end of said gear shift operation so as to disconnect said series-combination from said source, a junction point between said resistor means and said capacitor means being connected with said electric oscillator means for furnishing by its discharge at the end of a gear shift operation a control pulse of a second predetermined duration substantially within a range between .1 and 1 second to said electric oscillator means for causing the latter to furnish an energizing pulse of corresponding duration to said electromagnetic clutch.

6. An arrangement as claimed in claim 4, including relay means comprising normally closed contact means arranged in circuit between said electric oscillator means and said electromagnetic clutch, and relay coil means for opening, upon energization thereof, said contact means, said coil means being connected in parallel with said series-combination between said switch means and said one terminal of said source so that said relay coil is energized when said switch means is moved to closed position.

7. An arrangement as claimed in claim 5, including relay means comprising normally closed contact means arranged in circuit between said electric oscillator means and said electromagnetic clutch, and relay coil means for opening, upon energization thereof, said contact means, said coil means being connected in parallel with said series-combination between said switch means and said one terminal of said source so that said relay coil is energized when said switch means is moved to closed position.

8. An arrangement as claimed in claim 6, including second rectifier means connected in parallel with said coil means and arranged to block passage of a current that passes through said coil means.

9. An arrangement as claimed in claim 7, including second rectifier means connected in parallel with said coil means and arranged to block passage of a current that passes through said coil means.

References Cited in the file of this patent

UNITED STATES PATENTS

| 2,910,884 | Peras | Nov. 3, 1959 |
| 2,927,474 | Peras | Mar. 8, 1960 |

FOREIGN PATENTS

| 880,619 | Great Britain | Oct. 25, 1961 |
| 1,208,036 | France | Sept. 7, 1959 |